United States Patent [19]

Stillinger

[11] Patent Number: 4,473,206

[45] Date of Patent: Sep. 25, 1984

[54] ARTICULATED STRUCTURE FOR SUPPORTING LOADS

[75] Inventor: Scott H. Stillinger, Los Gatos, Calif.

[73] Assignee: Convergent Technologies, Inc., Santa Clara, Calif.

[21] Appl. No.: 309,944

[22] Filed: Oct. 9, 1981

[51] Int. Cl.³ .......................................... A47G 29/00
[52] U.S. Cl. .................................... 248/371; 248/346
[58] Field of Search ............... 248/181, 183, 184, 178, 248/179, 663, 658, 349, 346, 425, 398, 371, 372.1; 108/1, 7, 9; 269/66

[56] References Cited

U.S. PATENT DOCUMENTS

| 1,794,726 | 3/1931 | Mitchell | 248/181 |
| 2,652,648 | 9/1953 | Morley | 248/483 X |
| 3,970,792 | 7/1976 | Benham | 248/183 X |
| 4,068,961 | 1/1978 | Ebner | 248/181 X |
| 4,206,983 | 6/1980 | Nettman | 248/292.1 X |
| 4,349,173 | 9/1982 | Volka | 248/183 X |
| 4,365,779 | 12/1982 | Bates | 248/179 X |
| 4,372,515 | 2/1983 | Noonan | 248/178 |

FOREIGN PATENT DOCUMENTS

452486 11/1948 Canada .......................... 248/280.1

Primary Examiner—J. Franklin Foss
Attorney, Agent, or Firm—C. Michael Zimmerman

[57] ABSTRACT

A base for supporting a load defines a first articular concave spherical surface segment forming a first socket about an axis extending through the center of curvature of the surface segment. The socket is nested with a first mating articular convex spherical surface segment forming a first ball segment joined to a load carrying platform. A first strip of low friction bearing material is seated in a first recess encircling the axis at the perimeter of the first socket to support the first ball segment. The side of the first ball segment facing away from the first socket defines a second articular concave spherical surface segment forming a second socket. A second mating articular convex spherical surface segment forming a second ball segment joined to a retaining member is nested in the second socket. A second strip of low friction bearing material is seated in a second recess encircling the axis at the perimeter of the second ball to support the second ball segment. A circular hub with a key at one side thereof extends along the axis from the center of the second ball segment and through an elongated aperture formed in first ball segment to a mating seat and keyway formed at the center of the first socket. The key and keyway lock and base and retaining member together against relative movement. The elongated aperture permits the load carrying platform to move relative to the hub in the directions along the long dimension of the aperture and about the axis. Stops are located to limit the movement of the load carrying member in the permitted directions.

23 Claims, 9 Drawing Figures

FIG_1

FIG_2A

FIG_2B

FIG_3A

FIG_3B

FIG_5

ARTICULATED STRUCTURE FOR SUPPORTING LOADS

DISCLOSURE

The present invention relates generally to articulated load supporting structures and, more particularly, to a compact load supporting structure permitting complex movements of a supported load that is inexpensive and simple to manufacture.

Articulated load supporting structures are commonly employed to enable supported devices to be positioned in a variety orientations. Frequently, articulations must be capable of complex movements to accommodate a variety of widely different orientations. Usually, the complex movement require the articulated members to be capable of a combination of relative rotational movements. As the movements required of the articulation become more complex and the size and weight of the supported load greater, load support stability becomes more critical in the design of the articulation. Heretofore, quality articulated load supporting structures permitting complex load movements with a high degree of load support stability have been achieved at the expense of complex and costly articulation constructions. Inferior structures permitting such movements tend to provide less stable support for their loads, to be intolerant of the misalignment of the articulated members, to bind easily upon movement of the supported load and to have a short useful life.

In many applications of articulated load supporting structures, appearance and compactness are as desirable as function. For example, many offices are now organized around computer controlled distributed information processing systems. Generally, such systems include desktop units, typically, keyboard, video display and document stand units, which are maintained on desktops while in use. Since desktop space is at a premium, it is desirable that the units, including any articulated support structures therefor, utilize minimum desktop space. This requires the units to be compactly packaged. Packing attractiveness is also important, because it facilitates the design of environmentally pleasing surroundings.

One type of articulated load supporting structure that has been used in such devices includes an axially located shaft extending vertically from a base member through a slotted travel in a load bearing member. The load bearing member is mounted for rotational movement about the shaft and for movement of its slotted travel relative to the shaft. A circular bearing surface defined by a separate cylindrical body extending vertically from the base member, coaxially with the shaft supports the load bearing member for the movements at a convex surface defined by one of opposite sides of the load bearing member. A flat bearing plate extends perpendicularly from the shaft to engage the perimeter of a concave surface defined by the other of the opposite sides of the load bearing member and hold the structure together. Such structures are complex and costly, and tend to be massive in order to provide the desired support stability for the loads. Such characteristics are contrary to compact design. In other articulated load supporting structures, a mechanical yoke provides the desired movements. Such structure provides support close to its axis of rotation and, consequently, also tend to be massive in order to provide load support stability. Moreover, mechanical yoke mechanisms capable of complex movements are complex and costly.

Accordingly, several advantages will be realized from a compact articulated load supporting structure permitting complex movements that is inexpensive and simple to manufacture. Further advantages will be realized from such a structure that also provides a high degree of load support stability.

The load supporting structure of the present invention has features through which the foregoing and other advantages are realized. More particularly, the present invention is a articulated load supporting structure having three members defining nested articular spherical surface segments. One of the two members defining one of the two outermost nested articular surface segments forms a load support structure and the other of the two members defining the other of the two outermost nested articular surface segments forms a retainer. The third member defines articular spherical surface segments at opposite sides nested between the articular surface segments defined by the other two members. The third member serves to carry the load to be supported by the articulated load supporting structure. To permit the third member and load it carries to be rotated about an axis and the angular position of it to be changed in a extending plane along the axis at any rotational position, an elongated aperture is provided through the third member at a location along the articular surfaces. Stops are located to define limits of movement of the third member. The three members are secured together by a fastening means that extends through the elongated aperture and fastens together the two members defining the two outermost articular surfaces against relative movement. Two bearing members are provided, one being interposed each of the articular surfaces defined at opposite sides of the third member and a facing outermost articular surface with which it is nested to support relative movement between the nested surfaces at a location off the axis.

The aforesaid articulated load supporting structure has the advantage of permitting the articular surfaces to be formed as unitary parts of the load supporting member and load carrying member, respectively. This lends the structure to the manufacture by inexpensive simple molding techniques with inexpensive plastic materials. Furthermore, the nested articular surface arrangement enables the construction of a highly compact articulated load supporting structure capable of complex movements of the supported load. A particularly stable and compact load supporting structure is obtained by forming the articular surfaces so that the load support or first member defines a concave spherical articular surface segment, the retainer or second member defines a convex spherical articular surface segment, and the load carrying or third member defines complementary, i.e., convex and concave, spherical articular surface segments at its opposite sides for nesting with the surface segments defined by the other two members. The surface segments are thusly formed to have a common center of curvature, preferably, proximate the location of the center of mass of the load supported by the structure.

All of the aformentioned features of construction of the articulated load supporting structure of the present invention render the structure of particular value for use in articulated desktop office equipment where it is desired that minimum desktop space be occupied by the equipment. Its feature of compactness is important in that regard. The provision of a highly stable support for its load adds protection against accidental damage. In office environments, equipment frequently is exposed to rough treatment that can cause damaging tipping and falling, if the equipment has a support structure providing poor support stability. Inexpensiveness and simplicity of manufacture also is important in the construction of office equipment because of price sensitivity of the consumers of that equipment.

The foregoing and other features and advantages of the articulated load supporting structure of the present invention will become more apparent upon consideration of the following more detailed description of a preferred embodiment of the invention and appended claims taken together with the accompanying drawings in which:

The articulated load supporting structure of the present invention will be described in connection with a preferred embodiment arranged to support a load with respect to a horizontally disposed surface for complex movements relative to the surface. As will become more apparent upon consideration of the following detailed description of the preferred embodiment of the present invention, the articulated load supporting structure is arranged to permit rotational movement of the supported load through a limited angular range about an axis that is perpendicular to the horizontal surface, while at the same time permitting angular or tilting movements through a limited angular range in a vertically-extending plane at any rotational position of the supported load. These two permissible movements combine to allow the supported load to be subjected to complex movements so that it can be positioned for use in a variety orientations defined by a solid angle having its vertex located above the horizontal surface. However, as will become further apparent upon consideration of the foregoing and following description of the present invention, the articulated load supporting structure of the present invention can be adapted to various other uses for supporting loads for complex movements.

Figure 1:
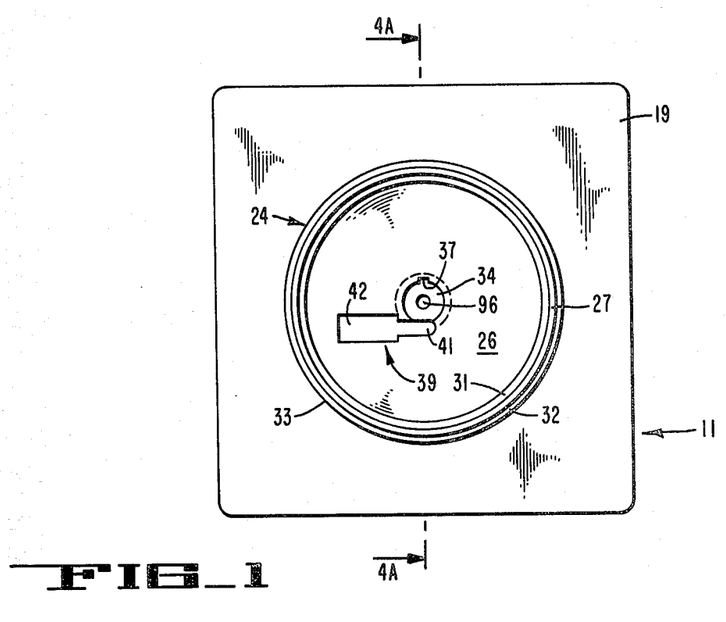
FIG. 1 is a top plan view of preferred embodiment of the base member of the articulated load support structure of the present invention.
Figure 2A:
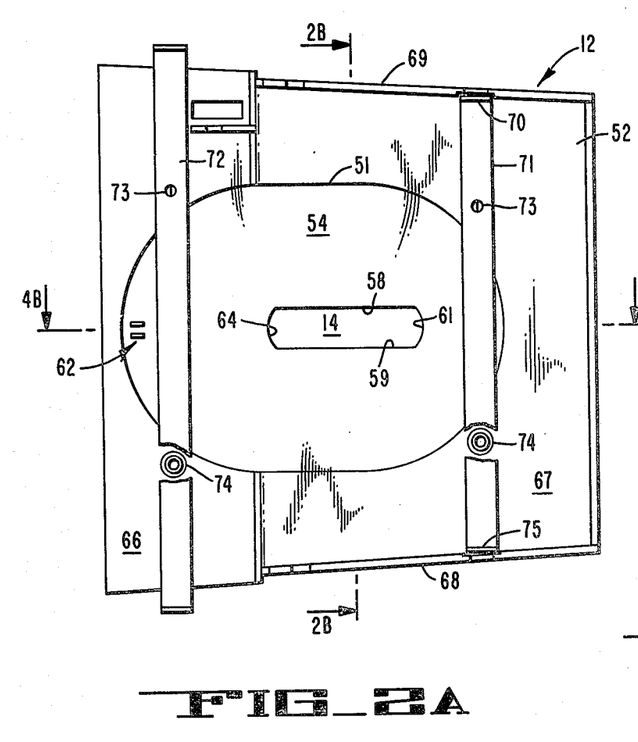
FIG. 2A is a top plan view of the load carrying member of the articulated load support structure of the present invention.
Figure 2B:
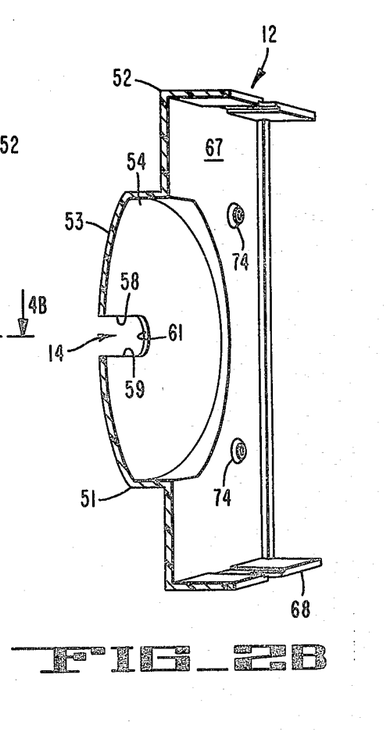
FIG. 2B is a side cross-section view of the load carrying member taken on the plane indicated by the lines 2B—2B in FIG. 2A.
Figure 3A:
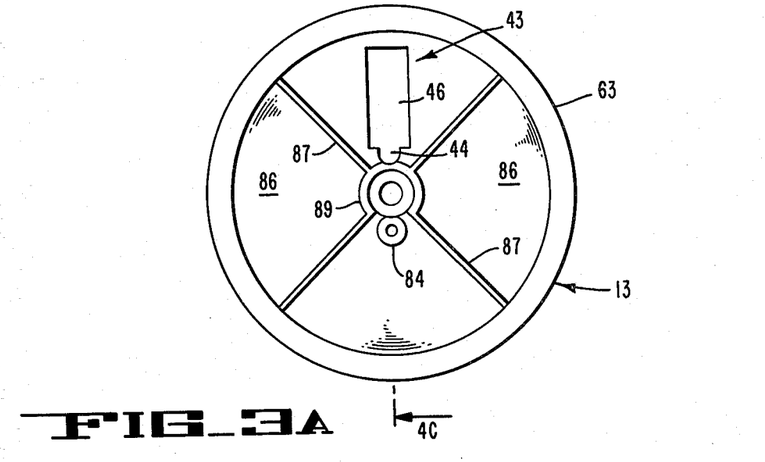
FIG. 3A is a top plan view of the retainer member of the articulated load support structure of the present invention.
Figure 3B:
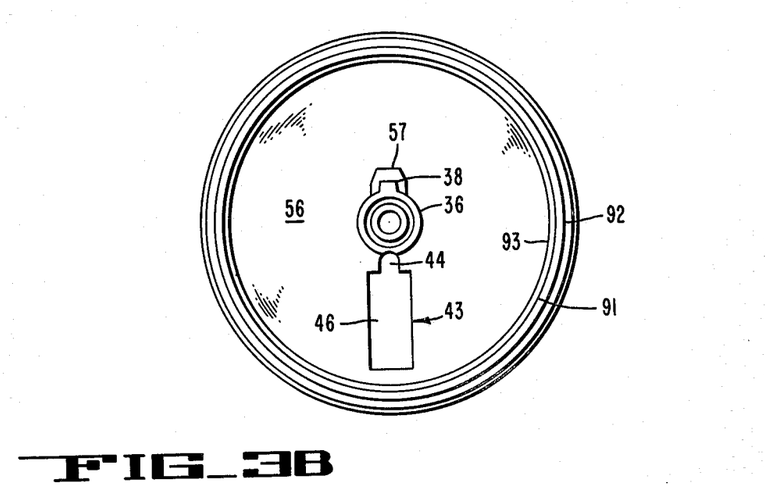
FIG. 3B is a bottom plan view of the retainer member illustrated in FIG. 3A.
Figure 4A:
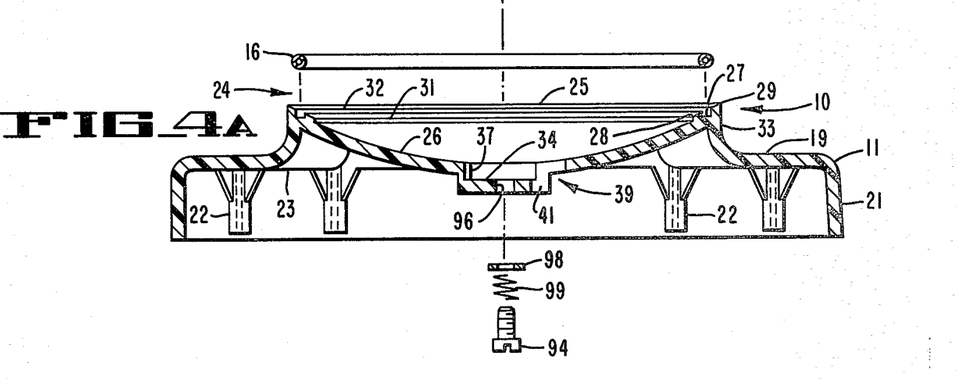
FIGS. 4A, 4B and 4C together illustrate the structural relationships of the base member, load carrying member and retainer member illustrated in FIGS. 1, 2A and 3A, respectively, with FIG. 4A being a side cross-section view of the base member taken on the plane indicated by lines 4A—4A in FIG. 1, FIG. 4B being a side cross-section view of the load carrying member taken on the plane indicated by lines 4B—4B in FIG. 2A, and FIG. 4C being a side cross-section view of the retainer taken on the plane indicated by lines 4C—4C in FIG. 3A.
Figure 4B:
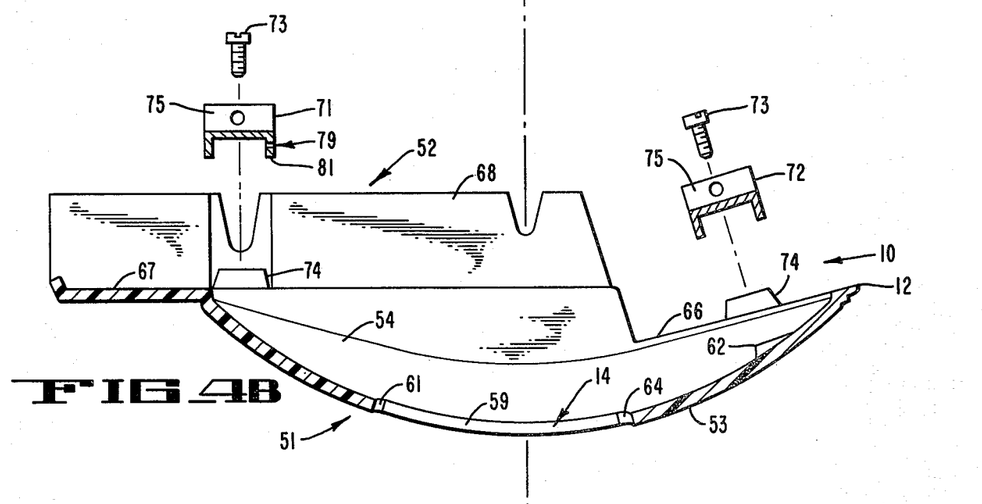
Figure 4C:
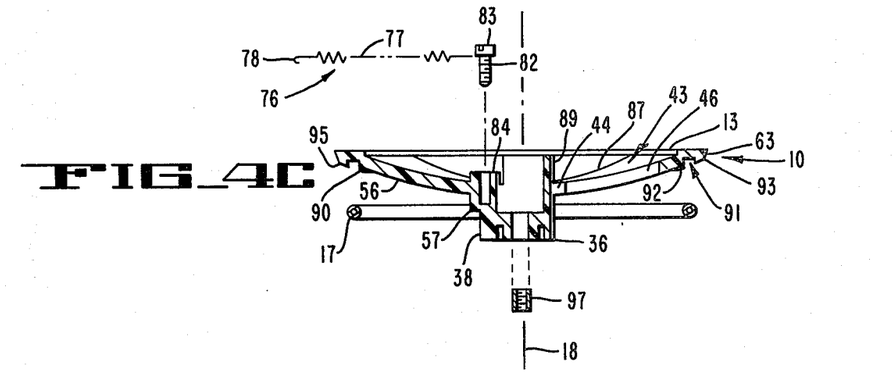

Referring to FIGS. 1 through 4, the assembly of the components forming the articulated load supporting structure 10 of the present invention is illustrated by the combined FIGS. 4A, 4B and 4C, with the certain views of the principal components forming the articulated structure 10 illustrated in FIGS. 1, 2 and 3. As seen in FIGS. 4A, 4B and 4C, the articulated load supporting structure 10 includes a base member 11 (FIG. 4A), a load carrying member 12 (FIG. 4B) and a retainer member 13 (FIG. 4C). It will be described more fully hereinafter, the base member 11 and retainer member 13 are joined together through an elongated aperture or slot 14 defined by the load carrying member 12 to be fixed against relative movement. On the other hand, the load carrying member 12 is supported between the base and retainer members 11 and 13, respectively, by a pair of bearing members 16 and 17 for limited rotational movement about an axis 18 and limited angular or tilting movement in a vertical plane extending along the axis at any rotational position.

Considering first the base member 11 illustrated in FIGS. 1 and 4A, it includes a rectangular platform 19 supported by a perimeter wall 21 to stand off a surface (not shown). A plurality of bosses 22 are joined to the underside 23 of the platform 19 to permit fastening of the base member 11 to a surface defined, for example, by some larger structure. The base member 11 has a central articular spherical segment 24 for supporting the load carrying member 12 for relative movement therewith. In the preferred embodiment of the present invention, the articular segment 24 defines a socket having an articular concave spherical surface 26 coaxially disposed with respect to the axis 18 to face away from the platform 19 towards the load carrying member 12. In the preferred embodiment, the axis 18 extends through the center of curvature of the concave spherical surface 26. A concave spherical surface 26 having its center of curvature located proximate the center of mass of the load supported above the surface by the load carrying member 12 is preferred. Locating the center of curvature and center of mass in this manner results in an articulated load supporting structure 10 that is capable of supporting loads with a high degree of stability regardless of the combined rotational and tilted position of the supported load. However, for loads of low mass or loads that have their center of mass located close to the articular concave spherical surface 26 and support stability is not a problem, the curvature of the articular surface 26 and those of the mating articular surfaces provided by the other members 12 and 13 can be reversed, i.e., the surface 26 curved convexly towards the load carrying member 12 and the mating surfaces of the other members changed accordingly.

The load carrying member 12 is supported for movement relative to the base member 11 by a bearing member 16 seated about the articular surface 26. In the preferred embodiment of the articular load supporting structure 10, the bearing member 16 is retained in a seat 27 defined by a channel having a U-shaped cross-section that encircles the axis 18 at the perimeter 25 of the articular surface 26. The channel is formed by a pair of inward and outward spaced walls 28 and 29 that extend a short distance above the articular surface 26 toward the load carrying member 12 in a direction parallel to the axis 18 to form a recess therebetween. The walls 28 and 29 extend to ends 31 and 32, respectively, defining a concave spherical surface segment that has the same center of curvature as the articular surface 26. A strip of low friction material, such as Teflon, of circular cross-section is seated in the channel 27 to form a bearing member 16 that supports the load carrying member 12 about the entire perimeter 25 of the articular surface 26. An enlarged view of channel 27 and bearing member 16 can be had by reference to FIG. 5.

Other bearing structures could be employed to support the load carrying member 12 at the base 11. For example, the single strip of low friction material can be replaced by several segments of low friction material. The segments can be positioned in various ways along the articular surface 26, such as at circumferentially spaced locations about the perimeter of the articular surface or at locations extending along the surface 26 from its perimeter towards the axis 18. Furthermore, other bearing types, such as ball bearings can be used. However, the bearing configuration of the preferred embodiment of the articulated load supporting structure 10 has the advantages of simplicity, ease of manufacture, minimum friction and noise-free operation.

To provide clearance for tilting movement of the load carrying member 12 of the preferred embodiment, the perimeter 25 of the spherically-shaped articular segment 24 is supported above the platform 19 by a circular wall 33 extending from the platform 19 towards the load carrying member 12. In addition, the circular wall 33 serves to enclose the joint cavity formed by the articular segment 24, improving the attractiveness of the articulated load supporting structure.

At the intersection of the axis 18 and the articular concave spherical surface 26 of the segment 24, the segment 24 defines a circular recess 34, best seen in FIG. 1, that is coaxial with the axis 18 for receiving a mating hub 36 of the retainer member 13 (FIG. 4C) extending coaxially with the axis 18. The articular segment 24 defines a keyway 37 at one side of the recess 34 for receiving a mating key 38 located at the corresponding side of the hub 36 of the retainer member 13 (FIG. 4C). As will be described in further detail hereinafter with reference to the retainer member 13, the engaged keyway 37 and key 38 lock the base member 11 and the retainer member 13 together against relative movement. The hub and key can be interchanged with the recess and keyway, i.e., the retainer member 13 can be constructed to form a centrally disposed recess and offset keyway and the articular segment 24 constructed to form the mating hub and key.

In accordance with a particularly salient feature of the articulated load supporting structure 10 of the present invention, an aperture or trough 39 is defined by the articular segment 24 at one side of the recess 34 opposite the keyway 37. As seen in FIG. 1, trough 39 has two segments. A first narrow trough segment 41 is located nearer the center of the articular segment 24 and defines a passage when the articulated load supporting structure 10 is assembled. A second wider trough segment 42 is located farther from the center of the articular segment 24 for facilitating threading items through the base member 11 into the passage during the assembly of the load supporting structure 10. As will be described more fully hereinafter, the trough 39 cooperates with a similar trough 43 provided in the retainer member 13 (FIGS. 3 and 4C) to define a passage for items through the articulated load supporting structure 10 to a load supported by the load carrying member 12 without interferring with the movement of the load and load carrying member. In embodiments of the load supporting structure 10 arranged to support electronic equipment loads, the passage defined through the structure is conveniently employed for passing electrical cables and larger connectors to the supported equipment.

As can be seen by reference to FIGS. 1, 3, 4A and 4C, trough 43 also has two segments like segments 41 and 42 of trough 39, namely, narrow trough segment 44 near the center of the retainer member 13 and wider trough segment 46 farther from the center of the retainer member. These two trough segments serve the same purpose as described hereinbefore for the two trough segments 41 and 42 of the articular segment 24 of the base member 11, namely, passage and threading of items through the retainer member 13. The two troughs 39 and 43 are oriented along lines that are perpendicular to each other and are vertically aligned in a direction parallel to the axis 18 so that the narrow trough segments 41 and 44 of the troughs 39 and 43, respectively, are vertically aligned with each other and the elongated slot 14 extending through the load carrying member 12 along a line parallel to and displaced from axis 18. With the two troughs 39 and 43 aligned in this manner, the two narrow trough segments 41 and 44 define a confined passage for cables or other items through the assembled articulated load supporting structure 10.

Reference will now be made to FIGS. 2A, 2B and 4B, which illustrate various views of the load carrying member 12. The load carrying member includes two principal parts: a double-sided articular segment 51 and a load carrying segment 52. Referring first to the double-sided articular segment 51, a first side 53 thereof defines an articular spherical surface of a shape for nesting with the articular surface 26 of the base member 11. The two nested surfaces 26 and 53 define a first articulating pair. In the preferred embodiment of the articulated load supporting structure 10, the articular surface 53 of the load carrying member 12 defines a segment of a ball to mate and nest with the socket defined by the articular surface 26 of the base member 11. The other side 54 of the double-sided articular segment 51 also defines an articular surface of a shape for nesting with the retainer member 13. In the preferred embodiment of the articulated load supporting structure 10, the articular surface defined by the side 54 is in the form of a socket having a concave spherical surface that nests with a mating ball segment having a convex spherical surface defined by the side 56 of the retainer member 13 (FIG. 4C). The two nested surfaces 54 and 56 define a second articulating pair.

The double-sided articular segment 51 defines the slot 14 centrally thereof at a location through which the axis 18, hence hub 36 passes. The slot 14 is orientated so that its long dimension extends in a direction along the load carrying member 12 with respect to which it is desired to provide tilting movement of the supported load. The slot 14 forms a moving travel in which the hub 36 extending from the retainer member 13 follows as the load carrying member 12 is moved. The length of the slot 14 determines the angular range through which the load carrying member 12 can be tilted. In the preferred embodiment of the articulated load supporting structure 10, the load carrying member 12 is restrained against tilting movement in the direction of the width of the slot 14. This restraint is achieved by selecting the width of the slot 14 to be just large enough to pass the hub 36. However, the hub 36 permits the load bearing member 12 to rotate about the axis 18. If the segment of the hub residing within the slot 14 is circular, the load bearing member 12 is able to rotate through an angle of 360°. However, in the preferred embodiment of the articulated load supporting structure 10, the hub 36 is provided with a axially offset segment 57 that serves as a stop that engages the long sides 58 and 59 of the elongated slot 14 to limit the angular range of rotation of the load bearing member 12. The offset segment 57 has opposite sides facing the long sides 58 and 59 of the slot 14, which taper towards each other at the free end of the offset segment. The angular range of permissible rotation of the load bearing member 12 about axis 18 is determined by the separation of and angle of taper of the opposite sides of the offset segment 57.

Figure 5:
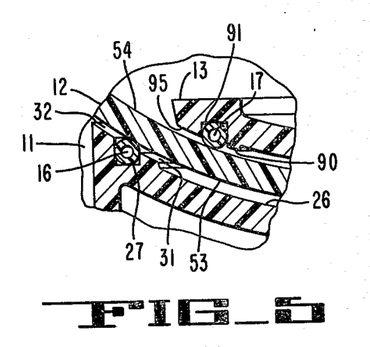
FIG. 5 is a side cross-section view illustrating the structural relationships of the assembled base member, load carrying member and retainer member illustrated in FIGS. 1, 2A and 3A at a location of the ring bearings located between the articulations formed by the members.

The load carrying member 12 and retainer member 13 are supported for relative movement with respect to each other by the bearing member 17 seated about the articular surface 56 defined by the retainer member 13. In the preferred embodiment of the articulated load supporting structure 10, the structure of the bearing member 17 is the same as that of the bearing member 16, namely, strip of low friction material, such as Teflon retained in a seat 91 encircling the axis 18 at the perimeter of the retainer member 13. However, other bearing supports, such as the types described hereinbefore with reference to bearing member 16, can be employed in the articulated load supporting structure 10 of the present invention between the load carrying member 12 and retainer member 13. An enlarged view of the bearing member 17 and its relationship with the retainer member 13 is shown in FIG. 5.

Since the load carrying member 12 is not permitted to tilt in the direction of the width of the slot 14, the lengths of the articular surfaces 53 and 54 need only be large enough in the direction of the width of the slot 14 to engage, respectively, the bearing members 16 and 17. However, the length of the articular surfaces 53 and 54 must be longer in the direction of the slot 14, which is the direction of permitted tilting movement. The lengths are selected so that the articular surfaces 53 and 54 always engage the bearing members 16 and 17, respectively, regardless of the tilt position of the articulated load supporting structure 10.

As has been described hereinbefore, the long sides 58 and 59 of the elongated slot 14 defined by the double-sided articular segment 51 cooperate with the stop defined by the offset segment 57 extending from the hub 36 of the retainer member 13 to limit the angle through which the load carrying member 12 can be rotated about the axis 18. Stops are also provided to limit the angle through which the load carrying member 12 can be tilted. One of the stops is provided by an end wall 61 of the slot 14 located at the side of the hub 36 opposite the trough 43. The end wall 61 determines the limit of backward angular tilt. The limit of forward angular tilt is determined by a stop defined by a boss 62 located on the surface 54 of the articular segment 51 in-line with the slot 14 on the side of the axis 18 opposite the end wall 61. The stop 62 is positioned on the surface 54 to engage the edge 63 of the retainer member 13 before the end wall 64 of the slot 14 engages items, such as a cable passing through the trough 43. This protects the cable from damage by repeated contact with the end wall 64. However, in embodiments of the articulated load supporting structure 10 not including the trough 43, the boss 62 can be omitted and the end wall 64 employed as the stop to limit the forward angular tilt. Similarly, the boss 62 can be omitted and the end wall 64 employed as a stop in embodiments of the load supporting structure 10 where the trough 43 is closed so that the end wall 10 cannot contact items passed through the trough, or the items passed through trough are otherwise protected from harmful contact with the end wall or not susceptible to damage by such contacts.

The platform segment 52 of the preferred embodiment of the articulated load supporting structure 10 is arranged to carry a video display monitor so that the screen of the monitor faces to the right of FIG. 4B. For that purpose, the platform segment 52 of the load carrying member 12 has lower and upper sections 66 and 67, upstanding slotted side walls 68 and 69 and a pair of U-shaped channels 71 and 72, all cooperating to secure the video display monitor to the load carrying member 12. The U-shaped channels 71 and 72 are secured by screws 73 to bosses 74. One channel 71 is secured to bosses 74 located proximate opposite sides of the upper section 67 of the platform segment 52. The other channel 72 is secured to bosses 74 located proximate opposite sides of the lower section 66 of the platform segment 52. Apertured appendages 70 and 75 vertically extend from each of the channels 71 and 72 at its opposite ends for securing the supported load to the channels, hence, platform segment 52.

Referring now to FIGS. 3 and 4C, the retainer member 13 is a thin, dish-shaped member defining the articular surface 56 at one of its opposite sides for mating and nesting with the articular surface 54 of the load carrying member 12. In the preferred embodiment of the articulated load supporting structure 10, the articular surface 56 defines a segment of a ball that nests and mates with the socket defined by the articular surface 54 of the load carrying member 12. The other opposite side 86 is concave to conserve material. Ribs 87 extend from the edge 63 of the retainer member 13 to an axial extension 89 of the hub 36. The ribs 87 add strength to the thin retainer member 13, thereby permitting less material to be used in its construction. The strip of bearing material 17 is retained in a seat 91 defined by a channel having a U-shaped cross-section and encircling the articular surface 56 at the edge 63 of the retainer member 13. The channel is formed by a pair of inward and outward spaced walls 92 and 93 that extend in a direction parallel to the axis 18 a short distance below the articular surface 56 toward the load carrying member 12 to form a recess therebetween. The walls 92 and 93 extend to ends 90 and 95, respectively, defining a spherical surface segment that has the same center of curvature as the articular surface 56.

The nested articular surfaces 26, 53, 54 and 56 are formed to have a common center of curvature located along the axis 18 extending through the center of the articular concave spherical surface segment 26 defined by the base member 11. Preferably, the curvatures of the articular surfaces are selected so that the common center of curvature is located proximate, and most desirably at the center of mass of the load supported by the load bearing member 12 above the articulated load supporting structure 10. Stable support is provided for the load by selecting the curvatures and positioning the load relative to the load bearing member 12 so that the load's center of mass is located proximate the common center of curvature above the articulated load supporting structure 10 within an area defined by a projection along the axis 18 of the surface segment 26 defined by the base member 11.

For design considerations other than those concerning load support stability, it may be desirable to position the load on the load bearing member 12 with the load's center of mass displaced from the common center of curvature. This creates a normal force acting about the center of curvature that tends to move the load bearing member 12 relative to the stationary base and retainer members 11 and 13 in the direction of the slot 14. If the coefficients of sliding friction of the bearing members 16 and 17 are small relative to the mass of the supported load, it may not be possible to maintain the load bearing member 12 and supported load fixed in position throughout the entire range of tilt without application of a force opposing that created by the normal force acting about the center of curvature. Thus, in such implementations of the articulated load supporting structure 10 of the present invention, means 76 (FIG. 4C) is provided for applying such opposing force to the load bearing member 12.

Referring to FIG. 4C, the preferred embodiment of the articulated load supporting structure 10, a tension spring serves as the opposing force applying means 76. One end of the spring 77 has a first hook 82 anchored by a self-threading screw 83 to a boss 84 joined to the stationary retainer member 13 at its upper side 86. The other end of the spring 77 has a second hook 78 which is secured to the load bearing member 12 at a location to the side of the axis 18 opposite the side to which the center of mass of the supported load is displaced relative to the common center of curvature. For supporting the aforementioned video display monitor having its center of mass displaced from the center of curvature towards the U-shaped channel 72 (FIG. 4B), the second hook 78 is inserted in an aperture 79 formed in the side wall 81 of the U-shaped channel 71.

The required opposing force is obtained by selecting a tension spring 77 having the appropriate spring constant. For given coefficient of sliding friction and bearing pressure, the spring constant is selected so that the opposing force established by the spring 77 reduces the net force tending to move the load bearing member 12 relative to the stationary base and retainer members 11 and 13 to less than the net sliding friction force established at the bearing members 16 and 17.

The sliding friction force at each bearing member (which is a product of the coefficient of sliding friction and resultant normal force at the bearing member) is adjustable in the preferred embodiment of the articulated load supporting structure 10 to facilitate obtaining the desired opposing force from the tension spring 77, while at the same time enabling ease of movement of the supported load by the user. More specifically and with reference to FIG. 4, a bolt 94 is passed through an aperture 96 located coaxially in the end wall of the recess 84 to engage an internally threaded bushing 97 seated coaxially in the hub 36. A washer 98 and tension spring 99 are provided between the head of the bolt 94 and the underside of the end wall of the recess 34. By advancing or withdrawing the bolt 94 from the bushing 97, the compression force exerted by the spring 99 between the base and retainer members 11 and 13 is increased and decreased, respectively. This causes the pressure exerted on the bearing members 16 and 17 by the base and retainer members 11 and 13 to be increased and decreased, accordingly, which produces a corresponding increase and decrease of the friction forces established at the bearing members.

FIG. 5 illustrates the relationship of the two bearing members 16 and 17, the base, load bearing and retainer members 11, 12 and 13, and the two seats 27 and 91 defined by the base and retainer members for retaining the bearing members. As shown in FIG. 5, bearing members 16 and 17 are out of vertical alignment. While vertical alignment of the bearing members is preferred, the articulated load supporting structure 10 of the present invention is not detrimentally effected by a small amount of vertical misalignment. In the preferred embodiment of the load supporting structure 10, the slight vertical misalignment was provided to facilitate construction of the load bearing member 12 and retainer member 13 with the boss 62 located on the load bearing member to interact with the edge 63 of the retainer member 13 and provide the desired angular tilt limit.

The articulated load supporting structure 11 is assembled by placing the load carrying member 12 on the base member 11, with the bearing member 16 properly seated therebetween. The retainer member 13 is placed on the load carrying member 12, with the bearing member 17 properly seated therebetween, so that the hub 36 is seated in the circular recess 34 with the key 38 in keyway 37. The members are secured together by passing the bolt 94 through the aperture 96 located coaxially in the end wall of the recess 34 to engage the internally threaded bushing 97 seated coaxially in the hub 36. The washer 98 and tension spring 99 are placed on the bolt 94 before the bolt is engaged with the bushing 97. Before the supported load is secured to the load carrying member 12, the counter balancing spring 77 is hooked to the channel member 71 and anchored to the retainer 13.

The construction of the articulated load supporting structure 10 permits the articulating members to be conveniently and inexpensively manufactured by molding processes. More importantly, however, the construction permits articulating members to be formed as unitary parts of the load supporting member 11 and the load carrying member 12, resulting in an articulated load supporting structure 10 of simplified construction. Furthermore, the articulated supporting structure 10 is readily adaptable to the articulating support of a wide variety of loads with a high degree of stability. The high degree of stability is obtained by selecting a radius of curvature for each articulating surface of the structure 10 according to the load supported so that the surfaces have same the center of curvature located proximate the center of mass of the supported load.

From the foregoing description of a preferred embodiment of the articulated load supporting structure 10 of the present invention, it will be appreciated that the structure is characterized by several features that individually and cooperatively enable the construction of various articulated load supporting structures permitting complex movements with a high degree of stability that are inexpensive and simple to manufacture. Therefore, the scope of the present invention is not limited except by the terms of the following claims.

I claim:

1. A structure for supporting a load for rotating and tilting movements, comprising:
 a first member having a side defining a first articular spherical surface segment having an axis that extends through the center of curvature of said first surface segment;
 a second member for joining to the load having oppositely facing sides, one of said oppositely facing sides defining a second articular spherical surface segment in a nested relationship with the first articular spherical surface segment, the other of said oppositely facing sides defining a third articular spherical surface segment, and said second member defining a first aperture of selected length and width extending between said oppositely facing sides about the axis;

a third member having a side defining a fourth articular surface segment in a nested relationship with the third articular spherical surface segment;

a first bearing means disposed between the first and second articular spherical surface segments for supporting relative movement therebetween at a location off the axis;

a second bearing means disposed between the third and fourth articular spherical surface segments for supporting relative movement therebetween at a location off the axis;

a fastening means extending through the first aperture to secure the first and third members together against relative movement while permitting limited relative movement between the second and both first and third members in directions along the length of the first aperture and about the axis;

said first and third articular spherical surface segments being concave, the second and fourth articular spherical surface segments being convex and the curvature of said surface segments having a common center of curvature, said second member having means for supporting a load having a center of mass in a position such that the center of mass will be spaced from said common center of curvature whereby said supported load will apply a first force to said second member at a distance from said common center of curvature and said structure further comprising means for applying a second force to said second member in opposition to said first force.

2. The structure according to claim 1 wherein each of the first and second bearing means is a strip of low friction material disposed along a line that encircles the axis.

3. The structure according to claim 1 wherein the first member defines a second aperture registered with the first aperture along a line parallel to and spaced from the axis, and the third member defines a third aperture registered with said second aperture along said line to form with said first and second apertures a passage through the first, second and third members along said line parallel to said axis.

4. The structure according to claim 3 wherein each of the second and third apertures are elongated having long and short dimensions, the long dimensions of said second and third apertures extending along lines extending in different directions, respectively, with segments of the elongated second and third apertures registered to form the passage.

5. The structure according to claim 1 further comprising stops located to limit the range of movement of the second member in the directions along the length of the first aperture and about the axis.

6. The structure according to claim 5 wherein said stops include a stationary boss supported in the first aperture spaced from the axis, said stationary boss having opposite sides spaced in the direction of the width of the first aperture a distance less than said width and located relative to opposite edges of the second member defining the width of said first aperture to engage said edges and limit movement of said second member about said axis.

7. The structure according to claim 6 wherein the fastening means includes a hub joined to the first and third members to extend along the axis through the first aperture to secure said first and third members against relative rotation, the stationary boss is joined to the hub, and said stops further include at least one of opposite edges of the second member defining the length of said first aperture to engage said hub and limit movement of said second member in the direction of the length of the first aperture.

8. The structure according to claim 1 further comprising means for adjusting the bearing pressure exerted on the first and second bearing means.

9. The structure according to claim 8 wherein the fastening means includes a hub joined to the first and third members to extend along the axis through the first aperture to secure the first and third members against relative rotation, and the means for adjusting the bearing pressure includes a screw securing said first and third members together at said hub with a compressible spring disposed between said screw and secured members.

10. The structure according to claim 1 wherein the fastening means includes a hub joined to the first and third members to extend along the axis through the elongated first aperture to secure said first and third members against relative rotation, and the hub is dimensioned to permit relative movement between said hub and the second member in the directions along the length of the elongated first aperture and about the axis while restraining said hub and said second member against relative movement in the direction of the width of said elongated first aperture.

11. The structure according to claim 10 wherein the stops include a boss joined to the hub for support within the elongated first aperture spaced from the axis, and the boss has opposite sides spaced in the direction of the width of the elongated first aperture a distance less than said width and located relative to opposite edges of the second member defining the width of said elongated first aperture to engage said edges and limit movement of said second member about said axis.

12. The structure according to claim 11 wherein the first member defines a second aperture registered with the elongated first aperture along a line parallel to and spaced from the axis, and the third member defines a third aperture registered with the second aperture along said line to form with said first and second apertures a passage through the first, second and third members along said line parallel to the axis.

13. The structure according to claim 12 wherein the line along which the second and third apertures are registered is spaced from the axis in a direction towards one of opposite edges of the second member defining the length of the elongated first aperture; the opposite sides of the boss dimensioned and located within the elongated first aperture to engage the opposite edges defining the width of said elongated first aperture before said opposite edges reach the passage formed by the registered first, second and third apertures; and the stops further include the other of opposite edges of the second member defining the length of the elongated first aperture for engaging the hub to limit movement of the second member along the length of said elongated first aperture, and a boss on the second concave surface segment spaced from the axis in the direction towards the one of opposite edges of the second member defining the length of said elongated first aperture to engage the third member and limit movement of said second member along the length of said elongated first aperture before said one of opposite edges defining the length of said elongated first aperture reaches the passage formed by the registered first, second and third apertures.

14. The structure according to either claim 10 or claim 17 further comprising means for adjusting the bearing pressure exerted on the first and second bearing means.

15. The structure according to claim 14 wherein the center of mass of the supported load is spaced from the common center of curvature whereby said supported load applies a first force to the second member at a distance from said common center of curvature, and further comprising means for applying a second force to the second member in opposition to the first force.

16. The structure according to claim 15 wherein each bearing means has a coefficient of sliding friction, the supported load and structure are productive of a normal force at the first and second bearing means, and the means for applying a second force is selected and the means for adjusting the bearing pressure is adjusted in accordance with the coefficients of sliding friction to be productive of a net force for movement of the second member in the direction along the length of the elongated first aperture less than the sum of products of each coefficient of sliding friction and the normal force.

17. The structure according to claim 16 wherein the means for applying a second force includes a spring having a selected spring constant coupled between the second member and the third member at the side of the axis opposite the direction in which the center of mass of the supported load is spaced from the common center of curvature, and the means for adjusting the bearing pressure includes an adjustable screw securing the first and third members together at said hub with a compressible spring interposed said screw and secured members.

18. The structure according to claim 17 wherein each of the first and second bearing means is a strip of low friction material disposed along a line that encircles the axis.

19. The structure according to claim 18 wherein the hub is joined to one of the first and third members centrally of its articular surface segment to extend towards the other of said first and third members, and said other of said first and third members defining a recess into which the hub is seated, and the fastening means further includes a key joined to one side of the hub, and a keyway defined at one side of the recess to receive the key when the hub is seated in said recess.

20. The structure according to claim 1 wherein the first member includes a wall surrounding the first concave surface segment that extends from a first end joined to a base towards a second end at the second member.

21. The structure according to claim 20 wherein each of the first concave surface segment and the second convex surface segment defines a circular perimeter, the first convex surface segment and the second concave surface segment have substantially equal first dimensions, respectively, in the direction of the width of the elongated first aperture just large enough to encircle the circular perimeters of both the first concave and second convex surface segments, and the first convex suface segment and the second concave surface segment have substantially equal second dimensions, respectively, in the direction of the length of the elongated first aperture larger than the first dimensions, respectively, to permit movement of the second member through a selected range along the length of the elongated first aperture.

22. The structure according to claim 21 wherein each of the first concave surface segment and the second convex surface segment define a recess proximate its perimeter encircling the axis and opening towards the second member, and each of the first and second bearing means is a strip of low friction material seated within said recess to extend outside thereof to engage said second member.

23. A structure for supporting a load for rotating and tilting movements, comprising:
    a first member having a side defining a first articular spherical surface segment about an axis that extends through the center of curvature of said first surface segment;
    a second member for joining to the load having oppositely facing sides defining a second articular spherical surface segment in a nested relationship with the first articular spherical surface segment, the other of said oppositely facing sides defining a third articular spherical surface segment, and said second member defining a first aperture of selected length and width extending between said oppositely facing sides about the axis;
    a third member having a side defining a fourth articular surface segment in a nested relationship with the third articular spherical surface segment;
    a first bearing means disposed between the first and second articular spherical surface segments for supporting relative movement therebetween at a location off the axis;
    a second bearing means disposed between the third and fourth articular spherical surface segments for supporting relative movement therebetween at a location off the axis; and
    a fastening means extending through the first aperture to secure the first and third members together against relative movement while permitting limited relative movement between the second and both first and third members in directions along the length of the first aperture and about the axis;
    said fastening means including means for varying the bearing pressure exerted on said first and second bearing means, said fastening means further including a hub joined to the first and third members to extend along said axis through the first aperture to secure the first and third members against relative rotation, and said fastening means comprising a screw extending through said first member and being threaded into the hub of said third member to secure said first and third members together at said hub, said means for varying the bearing pressure comprising a compressible spring carried on said screw, the degree of compression of which may be adjusted by rotation of said screw and thereby said bearing pressure, said screw having a head located externally of said first member to facilitate access thereto.

* * * * *